United States Patent
Kwon et al.

(10) Patent No.: US 11,322,759 B2
(45) Date of Patent: May 3, 2022

(54) SYSTEM FOR ESTIMATING AMOUNT OF PURGE OF FUEL CELL, AND SYSTEM AND METHOD FOR ESTIMATING HYDROGEN CONCENTRATION OF FUEL CELL USING THE SAME

(71) Applicants: Hyundai Motor Company, Seoul (KR); Kia Motors Corporation, Seoul (KR)

(72) Inventors: Soon Woo Kwon, Gyeonggi-do (KR); Ik Jae Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 16/686,372

(22) Filed: Nov. 18, 2019

(65) Prior Publication Data
US 2021/0020969 A1 Jan. 21, 2021

(30) Foreign Application Priority Data
Jul. 16, 2019 (KR) .......................... 10-2019-0085992

(51) Int. Cl.
- *H01M 8/04* (2016.01)
- *H01M 8/04119* (2016.01)
- *H01M 8/04791* (2016.01)

(52) U.S. Cl.
CPC ... *H01M 8/04179* (2013.01); *H01M 8/04798* (2013.01)

(58) Field of Classification Search
CPC ...................... H01M 8/04179; H01M 8/04798
See application file for complete search history.

(56) References Cited

U.S. PATENT DOCUMENTS

| | | | |
|---|---|---|---|
| 2010/0190080 A1* | 7/2010 | Hasuka | H01M 8/04805 429/446 |
| 2014/0004438 A1* | 1/2014 | Wake | H01M 8/0491 429/444 |
| 2016/0099478 A1* | 4/2016 | Ihonen | H01M 8/04097 429/413 |
| 2016/0322657 A1* | 11/2016 | Fukatsu | H01M 8/04559 |

(Continued)

FOREIGN PATENT DOCUMENTS

| KR | 101459815 B1 | 11/2014 |
|---|---|---|
| KR | 10-2019-0025087 A | 3/2019 |

(Continued)

*Primary Examiner* — Amanda C. Walke
(74) *Attorney, Agent, or Firm* — Mintz Levin Cohn Ferris Glovsky and Popeo, P.C.; Peter F. Corless

(57) ABSTRACT

A system for estimating the amount of purge of a fuel cell is provided. The system includes a fuel cell that generates power by receiving hydrogen at an anode side and receives oxygen at a cathode side. A recirculation line is connected with the anode side of the fuel cell, and the gas included hydrogen therein is circulated in the recirculation line. A flow amount estimator estimates the flow amount of gas inside the recirculation line. A purge valve is positioned in the recirculation line and discharges the gas in the recirculation line to the outside when opened. A purge amount estimator estimates the amount of purge for each gas discharged through the purge valve by reflecting the flow amount of the gas estimated by the flow amount estimator.

7 Claims, 5 Drawing Sheets

(56) References Cited

U.S. PATENT DOCUMENTS

| | | | |
|---|---|---|---|
| 2018/0294497 A1* | 10/2018 | Asai | H01M 8/04447 |
| 2019/0074526 A1* | 3/2019 | Chikugo | H01M 8/04104 |
| 2020/0153012 A1* | 5/2020 | Kim | H01M 8/04089 |
| 2021/0020968 A1* | 1/2021 | Kwon | H01M 8/04097 |

FOREIGN PATENT DOCUMENTS

| | | |
|---|---|---|
| KR | 10-2019-0070205 A | 6/2019 |
| KR | 10-2019-0108293 A | 9/2019 |
| KR | 10-2019-0108304 A | 9/2019 |
| KR | 10-2020-0050508 A | 5/2020 |

* cited by examiner

SYSTEM FOR ESTIMATING AMOUNT OF PURGE OF FUEL CELL, AND SYSTEM AND METHOD FOR ESTIMATING HYDROGEN CONCENTRATION OF FUEL CELL USING THE SAME

CROSS REFERENCE TO RELATED APPLICATION

The present application claims priority of Korean Patent Application No. 10-2019-0085992 filed on Jul. 16, 2019, the entire contents of which is incorporated herein for all purposes by this reference.

BACKGROUND

Field of the Disclosure

The present disclosure relates to a system for estimating the amount of purge of a fuel cell, and a system and a method for estimating hydrogen concentration of a fuel cell using the same, and more specifically, to a technology of estimating the amount of purge for each gas discharged to the outside from an anode side of a fuel cell more accurately, and estimating hydrogen concentration at an anode side of a fuel cell by using the same.

Description of the Related Art

A fuel cell converts chemical energy into electric energy using the oxidation and reduction reaction of hydrogen and oxygen supplied from a hydrogen supply apparatus and an air supply apparatus, respectively, and includes a fuel cell stack that produces electric energy and a cooling system that cools the stack, etc. In other words, hydrogen is supplied to the anode side of the fuel cell, and the oxidation reaction of hydrogen is performed at the anode to generate hydrogen ions (protons) and electrons, and the generated hydrogen ions and electrons are to a cathode through an electrolyte membrane and a separator plate, respectively. Water is generated at the cathode through an electrochemical reaction in which the hydrogen ions and electrons moving from the anode, and oxygen in the air are involved, and the electric energy is generated from the flow of the electrons.

Since the hydrogen supplied to the anode side of the fuel cell should maintain a proper level of hydrogen concentration, a proper hydrogen purge control is performed in a hydrogen recirculation line. The hydrogen purge control generally estimates the hydrogen concentration in real time, and accordingly, performs the hydrogen purge control to maintain the proper level of the hydrogen concentration. Conventionally, since there is no method capable of estimating the hydrogen concentration of the anode side of the fuel cell stack, a method for defining a value obtained by integrating the output current of the fuel cell with time and multiplying a weighting factor as Q, and performing a purge when the Q value reaches a reference value that has been experimentally tuned has controlled to maintain the hydrogen concentration of the anode side of the fuel cell stack (e.g., current accumulation control).

However, in the conventional purge control method, the relationship between the hydrogen concentration, which is an actual control object, and the Q value is not clear, and accordingly, the reference of the target hydrogen concentration or the target hydrogen pressure is not clear and thus the optimal hydrogen concentration control is unable to be performed. In particular, conventionally, the gas concentration according to the flow amount of gas at the anode side changed based on an operation of the fuel cell is not considered, and assuming the gas concentration at the anode side is uniform, the amount of purge for each gas is estimated, thus not actually reflecting the non-uniform gas concentration inside the anode side.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a technique for accurately estimating the amount of purge for each gas by reflecting the flow amount of the gas circulated at an anode side of a fuel cell, and estimating the hydrogen concentration of the anode side using the same.

A system for estimating the amount of purge of a fuel cell according to the present disclosure for achieving the object may include a fuel cell configured to generate power by receiving hydrogen at an anode side, and receiving oxygen at a cathode side, a recirculation line connected with the anode side of the fuel cell, and in which the gas including hydrogen therein is circulated, a flow amount estimator configured to estimate the flow amount of gas inside the recirculation line, a purge valve positioned in the recirculation line, and configured to discharge the gas in the recirculation line to the outside when opened, and a purge amount estimator configured to estimate the amount of purge for each gas discharged through the purge valve by reflecting the flow amount of the gas estimated by the flow amount estimator. The purge valve may be positioned at the rear end of the anode of the fuel cell in the recirculation line to discharge the gas in the recirculation line having passed the fuel cell to the outside.

The system for estimating the amount of purge of the fuel cell may further include a differential pressure calculator configured to calculate the differential pressure between the front end and the rear end of the purge valve. The purge amount estimator may be configured to estimate the total amount of purge discharged through the purge valve using the differential pressure calculated by the differential pressure calculator, and estimate the amount of purge for each gas using the estimated total amount of purge and the flow amount of the gas estimated by the flow amount estimator.

Additionally, the flow amount estimator may be configured to estimate the flow amount of the gas as being increased as the generated current or the generated power of the fuel cell increases. The flow amount estimator may be configured to estimate the flow amount of the gas as being increased as the average molecular weight of the gas comprised in the recirculation line reduces. The purge amount estimator may be configured to estimate the amount of purge for each gas as being proportional to the mass ratio of the corresponding gas among the total amount of purge. The purge amount estimator may also be configured to estimate the amount of purge for each gas by reflecting a weight to the mass of nitrogen, for the purge amount of nitrogen among the total amount of purge, and the weight may be previously mapped to be reduced as the flow amount of the gas estimated by the flow amount estimator increases.

The system for estimating the amount of purge of the fuel cell may further include a purge controller configured to adjust an opening period, an opening degree, or an opening holding time of the purge valve based on the amount of purge estimated by the purge amount estimator. A system for estimating hydrogen concentration of a fuel cell according to the present disclosure for achieving the object may further include a concentration estimator configured to estimate hydrogen concentration in the recirculation line based on the amount of purge estimated by the purge amount estimator.

The concentration estimator may be configured to estimate hydrogen concentration in the recirculation line based on the total amount of gas in the recirculation line, the amount of crossover crossed-over between the anode side and the cathode side of the fuel cell, and the estimated amount of purge for each gas. In addition, the concentration estimator may be configured to estimate the concentration for each gas in the recirculation line. The purge amount estimator may be configured to estimate the total amount of purge discharged through the purge valve, and estimate the amount of purge for each gas using the estimated total amount of purge and the concentration for each gas estimated by the concentration estimator.

A method for estimating hydrogen concentration of a fuel cell according to the present disclosure for achieving the object may include estimating the flow amount of the gas in a recirculation line for circulating the gas including hydrogen to an anode side of a fuel cell, estimating the amount of purge for each gas discharged to the outside through a purge valve positioned in the recirculation line based on the estimated flow amount of the gas, and estimating hydrogen concentration in the recirculation line based on the estimated amount of purge.

The estimating of the flow amount of the gas in the recirculation line may include estimating the flow amount of the gas as being increased as the generated current or the generated power of the fuel cell increases. The estimating of the flow amount of the gas in the recirculation line may also include estimating the flow amount of the gas as being increased as the average molecular weight of the gas comprised in the recirculation line reduces.

Further, the estimating of the amount of purge for each gas may include estimating the amount of purge for each gas as being proportional to the mass ratio of the corresponding gas among the total amount of purge. The estimating of the amount of purge for each gas may include estimating the amount of purge for each gas by reflecting a weight to the mass of nitrogen, for the purge amount of nitrogen among the total amount of purge, and the weigh may be previously mapped to be reduced as the flow amount of the gas estimated by the flow amount estimator increases.

The method for estimating hydrogen concentration of the fuel cell may further include, before estimating the amount of purge for each gas, calculating the differential pressure between the front end and the rear end of the purge valve, and estimating the total amount of purge discharged through the purge valve using the calculated differential pressure. The estimating of the amount of purge for each gas may include estimating the amount of purge for each gas using the estimated total amount of purge, the estimated flow amount of the gas in the recirculation line, and the previously estimated concentration for each gas in the recirculation line.

Additionally, the estimating of the hydrogen concentration in the recirculation line may include estimating the hydrogen concentration in the recirculation line based on the total amount of gas in the recirculation line, the amount of crossover crossed-over between the anode side and a cathode side of the fuel cell, and the estimated amount of purge for each gas. The method for estimating hydrogen concentration of the fuel cell may further include, after estimating the hydrogen concentration in the recirculation, adjusting an opening period, an opening degree, or an opening holding time of the purge valve based on the estimated hydrogen concentration in the recirculation line.

According to the system for estimating the amount of purge of the fuel cell, it may be possible to more accurately estimate the amount of purge for each gas through the purge valve when the concentration for each gas in the recirculation line is not uniform by reflecting the flow amount of the gas. In addition, according to the system and method for estimating hydrogen concentration of the fuel cell using the same, it may be possible to more accurately estimate the hydrogen concentration of the gas supplied to the anode side of the fuel cell, thereby controlling the concentration to be maintained at the target hydrogen concentration, and accordingly, enhancing fuel economy and durability of the fuel cell.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
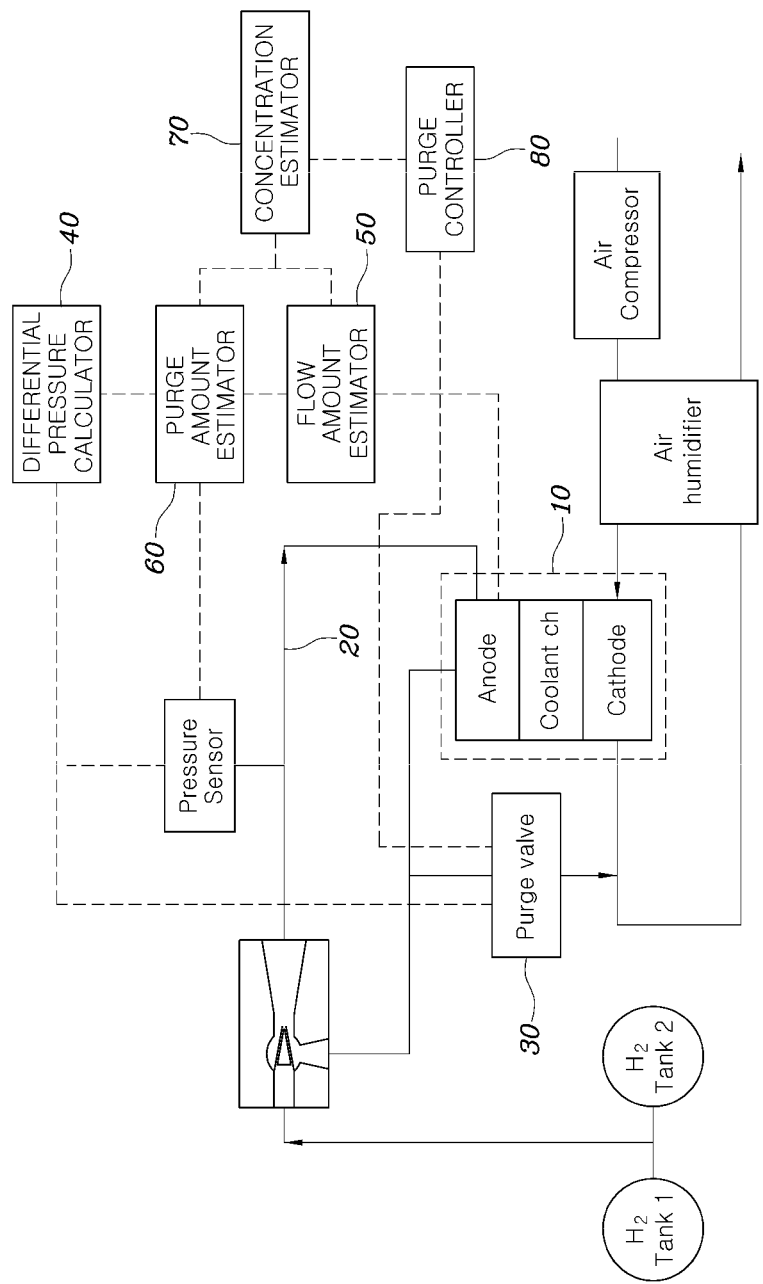
FIG. 1 is a block diagram illustrating a system for estimating the amount of purge of a fuel cell and a system for estimating hydrogen concentration of the fuel cell using the same according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to or specifically programmed to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present disclosure disclosed in the specification or application are only for the purpose of illustrating the embodiments of the present disclosure, and the exemplary embodiments in accordance with the present disclosure may be embodied in various forms and should not be construed as limited to the exemplary embodiments set forth in the specification or application.

Various modifications and various forms may be made in the exemplary embodiments according to the present disclosure, so that specific exemplary embodiments are illustrated in the drawings and described in detail in the specification or application. It should be understood, however, that it is not intended to limit the embodiments in accordance with the concepts of the present disclosure to the particular disclosed forms, but includes all modifications, equivalents, and alternatives falling within the sprit and technical scope of the present disclosure.

The terms "first" and/or "second," and the like may be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure.

It will be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

The terminology used the specification is for the purpose of describing particular exemplary embodiments only and is not intended to limit the present disclosure. The singular forms are intended to include the plural forms as well, unless the context clearly indicates otherwise. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, the present disclosure will be described in detail by describing preferred embodiments of the present disclosure with reference to the accompanying drawings. The same reference numerals indicated in each drawing denote the same members.

Figure 2:
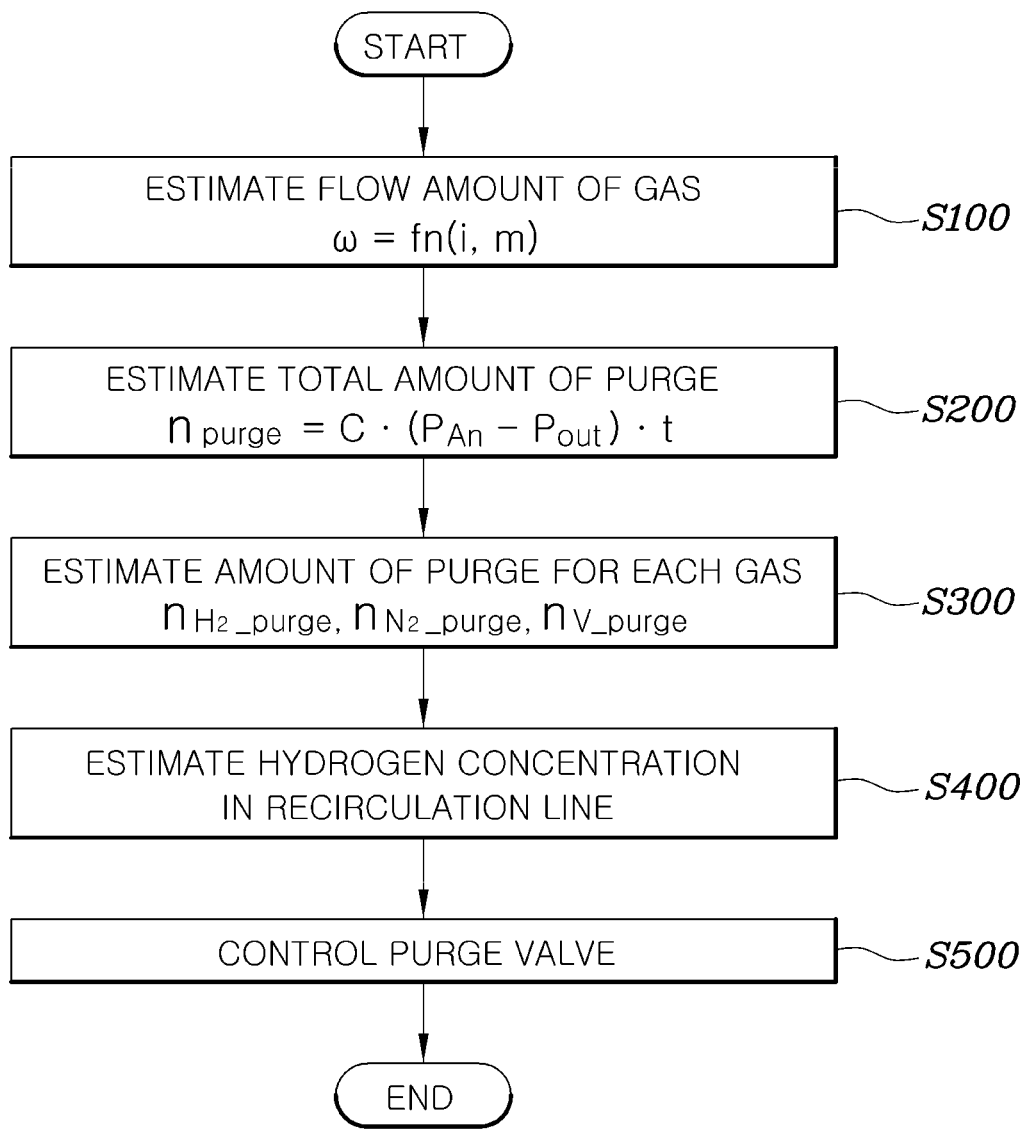
FIG. 2 is a flowchart illustrating a method for estimating hydrogen concentration of the fuel cell according to an exemplary embodiment of the present disclosure.

FIG. 1 is a block diagram illustrating a system for estimating the amount of purge of a fuel cell 10 and a system for estimating hydrogen concentration of the fuel cell 10 using the same according to an exemplary embodiment of the present disclosure, and FIG. 2 is a flowchart illustrating a method for estimating hydrogen concentration of the fuel cell 10 according to an exemplary embodiment of the present disclosure.

Referring to FIGS. 1 and 2, a system for estimating the amount of purge of a fuel cell 10 according to an exemplary embodiment of the present disclosure may include the fuel cell 10 configured to receive hydrogen at an anode side, and receive oxygen at a cathode side to generate power; a recirculation line 20 connected to the anode side, and in which gas having hydrogen contained therein is circulated; a flow amount estimator 50 configured to estimate the flow amount of gas inside the recirculation line 20; a purge valve 30 positioned in the recirculation line 20, and configured to discharge the gas in the recirculation line 20 to the outside when opened; and a differential pressure calculator 40 configured to estimate the amount of purge for each gas discharged through the purge valve 30 by reflecting the flow amount of the gas estimated by the flow amount estimator 50.

The fuel cell 10 is a stack of the fuel cell 10 including a membrane electrode assembly (MEA) therein, and configured to generate electric energy by the mutual chemical reaction between oxygen and hydrogen therein. Specifically, a gas containing hydrogen may be supplied to the anode 11 side of the fuel cell 10, and a gas such as air containing oxygen may be supplied to the cathode 12 side of the fuel cell 10. The recirculation line 20 may be connected to the anode 11 side of the fuel cell 10 to supply hydrogen to the fuel cell 10 stack. In particular, is the recirculation line 20 may be connected so that the gas containing the hydrogen discharged to the outlet through the fuel cell 10 may be recirculated to the inlet of the fuel cell 10 again.

The purge valve 30 may be positioned in the recirculation line 20. According to the purge control in which the purge valve 30 is opened, the gas containing hydrogen in the recirculation line 20 may be discharged to the outside. In particular, the gas containing impurities in the recirculation line 20 may be discharged to the outside by the purge control, and pure hydrogen may be supplied from a hydrogen tank to maintain the hydrogen concentration in the recirculation line 20.

The flow amount estimator 50 may be configured to estimate the flow amount of the gas inside the recirculation line 20. As described later, the flow amount estimator 50 may be configured to estimate the flow amount at which the gas circulates inside the recirculation line 20, or estimate the flow amount diffused based on the motion of molecules contained in the gas. In other words, the flow amount may include the flow according to the diffusion motion of the molecules contained in the fluid as well as the flow amount of the gas flowing in one direction. The purge amount estimator 60 may be configured to estimate the amount of purge for each gas discharged through the purge valve 30 by reflecting the flow amount of the gas estimated by the flow amount estimator 50. In an exemplary embodiment, the purge amount estimator 60 may be configured to estimate the amount of hydrogen, the amount of nitrogen and the amount of vapor, respectively, assuming that the gas in the recirculation line 20 is composed of hydrogen, nitrogen, and vapor.

Figure 3:
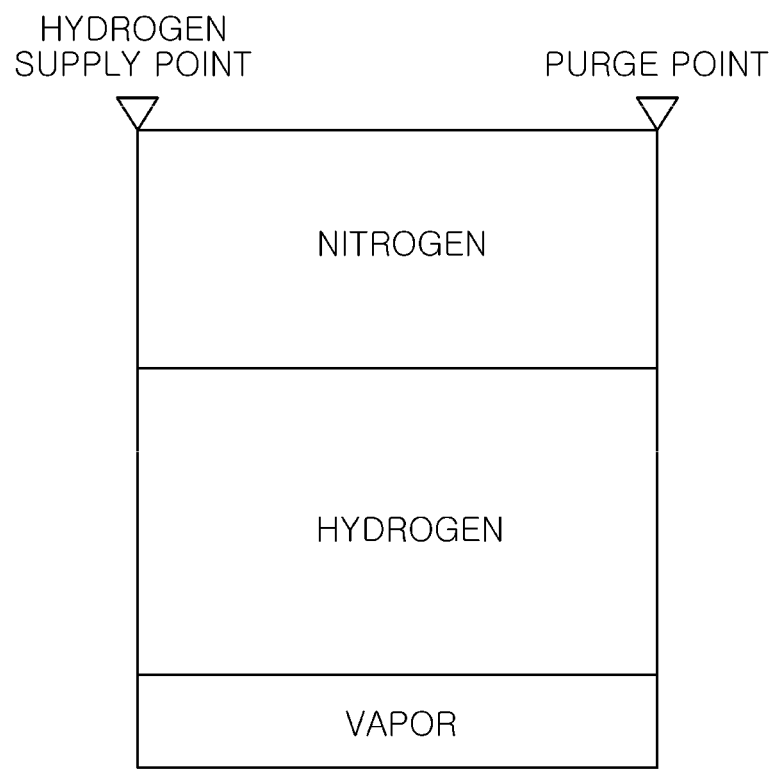
FIG. 3 is a diagram illustrating the concentration for each gas in a recirculation line assuming according to the related art.
Figure 4:
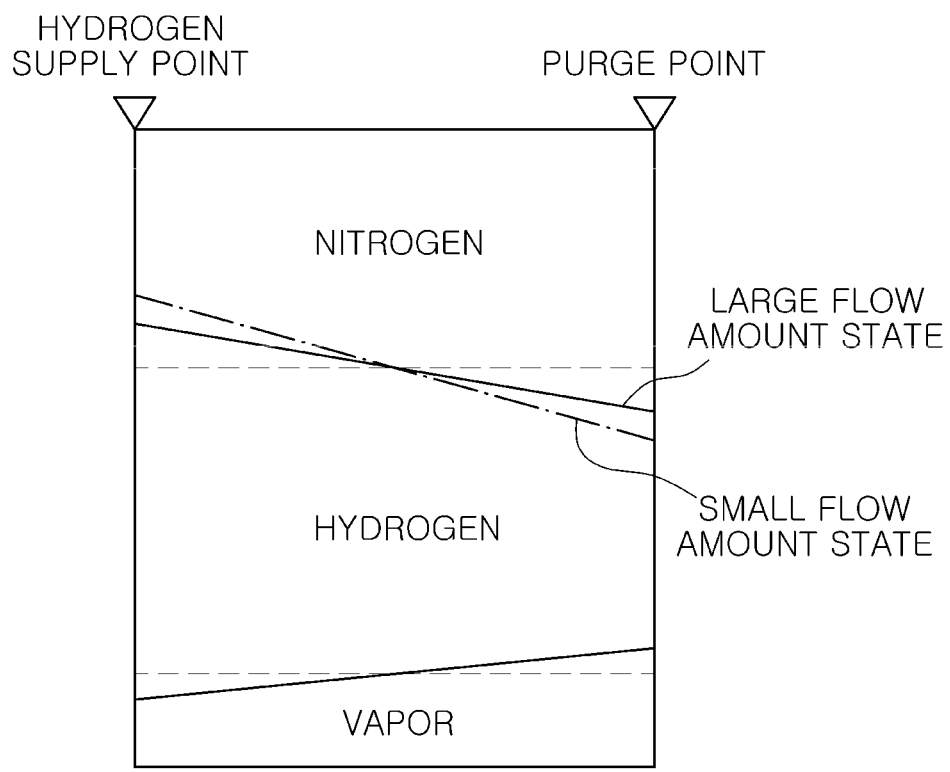
FIG. 4 is a diagram illustrating the actual concentration for each gas in the recirculation line according to the related art.

FIG. 3 is a diagram illustrating the concentration for each gas in the recirculation line 20 assuming according to the related art, and FIG. 4 is a diagram illustrating the actual concentration for each gas in the recirculation line 20. Further referring to FIGS. 3 to 4, according to the related art, it was assumed that the recirculation line 20 has the same gas concentration regardless of a position thereof.

Specifically, there is a difference between the concentration for each gas in an ejector, which is a point where the recirculation line 20 is connected with a hydrogen tank to supply hydrogen by the reaction and the crossover, etc. between the anode and the cathode through a MEA in the fuel cell 10, and the concentration for each gas in the purge valve 30 discharged by passing through the anode side of the fuel cell 10 and purged to the outside. However, it was conventionally assumed that the concentration for each gas is uniform at all points of the recirculation line 20 as in FIG. 3, but in reality, the concentration for each gas in the recirculation line 20 is different as shown in FIG. 4.

More specifically, when the high current or the high power is output from the fuel cell 10, the flow amount in the recirculation line 20 increases and therefore, the concentration of each gas according to the position of the recirculation line 20 is close to uniformity, but in the section of operating so that the fuel cell 10 outputs the low current or the low power, the flow amount in the recirculation line 20 decreases and therefore, the concentration of each gas according to the position of the recirculation line 20 becomes more non-uniform.

To more accurately reflect this actual phenomenon, the present disclosure includes estimating the amount of purge for each gas discharged through the purge valve 30 by reflecting the estimated flow amount of the gas. Accordingly, it may be possible to more accurately estimate the amount of purge for each gas through the purge valve 30 in the state where the concentration for each gas in the recirculation line 20 is non-uniform as in the low current operation section of the fuel cell 10.

The purge valve 30 may be positioned at the rear end of the anode of the fuel cell 10 in the recirculation line 20 to discharge the gas in the recirculation line 20 having passed through the fuel cell 10 to the outside. When the exhaust and crossover of hydrogen, etc. are completed by the material exchange and the power generation with the cathode through the anode of the fuel cell 10, the gas in the recirculation line 20 partially consumes hydrogen and contains a substantial amount of impurities. The purge valve 30 may be positioned at the rear end of the anode of the fuel cell 10 in the recirculation line 20 to discharge the gas containing a substantial amount of impurities to the outside.

The present disclosure may further include a differential pressure calculator 40 configured to calculate the differential pressure between the front end and the rear end of the purge valve 30. The purge amount estimator 60 may be configured to estimate the total amount of purge discharged through the purge valve 30 using the differential pressure calculated by the differential pressure calculator 40, and estimate the amount of purge for each gas using the estimated total amount of purge and the flow amount of the gas estimated by the flow amount estimator 50.

The differential pressure calculator 40 may be configured to calculate the differential pressure between the front end and the rear end of the purge valve 30 by subtracting the rear end pressure from the front end pressure of the purge valve 30. Specifically, the front end of the purge valve 30 may be positioned at the rear end of the anode side of the recirculation line 20, and it may be possible to measure the front end pressure of the purge valve 30 using a pressure sensor mounted in the recirculation line 20. In addition, the rear end of the purge valve 30 may be connected directly to the outside of the vehicle, or connected to the outlet of the cathode side.

Specifically, the differential pressure calculator 40 may be configured to calculate the total purge rate with time as follows using the differential pressure calculated by the differential pressure calculator 40 and a purge gain (C), and calculate the total amount of purge by multiplying the total purge rate by a holding time (t).

$$n_{purge} = C(P_{An} - P_{out})$$

The amount of purge for each gas may be calculated by multiplying the total amount of purge by the concentration for each gas in the recirculation line 20 in an exemplary embodiment, but the present disclosure may include estimating the amount of purge for each gas by reflecting the flow amount of the gas estimated by the flow amount estimator 50. The flow amount estimator 50 may be configured to estimate the flow amount of gas as being increased as the generated current or the generated power of the fuel cell 10 increases.

When the generated current or the generated power of the fuel cell 10 increases, the amount of hydrogen consumed in the fuel cell 10 may increase, and accordingly, the flow amount of gas may increase. Conversely, when the generated current or the generated power of the fuel cell 10 decreases, the amount of hydrogen consumed in the fuel cell 10 may decrease, and thus, the flow amount of gas may also decrease. Accordingly, the flow amount estimator 50 may be configured to estimate that the flow amount of the gas flowing in one direction may be increased, thereby increasing the flow amount of the gas, as the generated current or the generated power of the fuel cell 10 increases. In addition, the flow amount estimator 50 may be configured to estimate the flow amount of the gas as being increased as the average molecular weight of the gas included in the recirculation line 20 decreases.

In an exemplary embodiment, the average molecular weight of the gas may be estimated using the concentration for each gas and the molecular weight for each gas in the recirculation line 20. The concentration for each gas in the recirculation line 20 may use the amount of hydrogen, the amount of nitrogen, and the amount of vapor estimated by the concentration estimator 70 as the concentration for each gas as described below. The molecular weight for each gas refers to the mass of one mole of molecules, hydrogen may be about 2.016 [g], nitrogen may be about 28.016 [g], and vapor may be about 18.02 [g]. In other words, the average molecular weight may be calculated by multiplying and summing the molecular weight for each gas according to the concentration for each gas.

In another exemplary embodiment, the mass of the gas included in the recirculation line 20 may be calculated by dividing the number of moles of the gas in the recirculation line 20. Since the volume of the recirculation line 20 is the same, the number of moles of the gas in the recirculation line 20 may be assumed to be constant, assuming that the pressure of the recirculation line 20 is constant.

Figure 5:
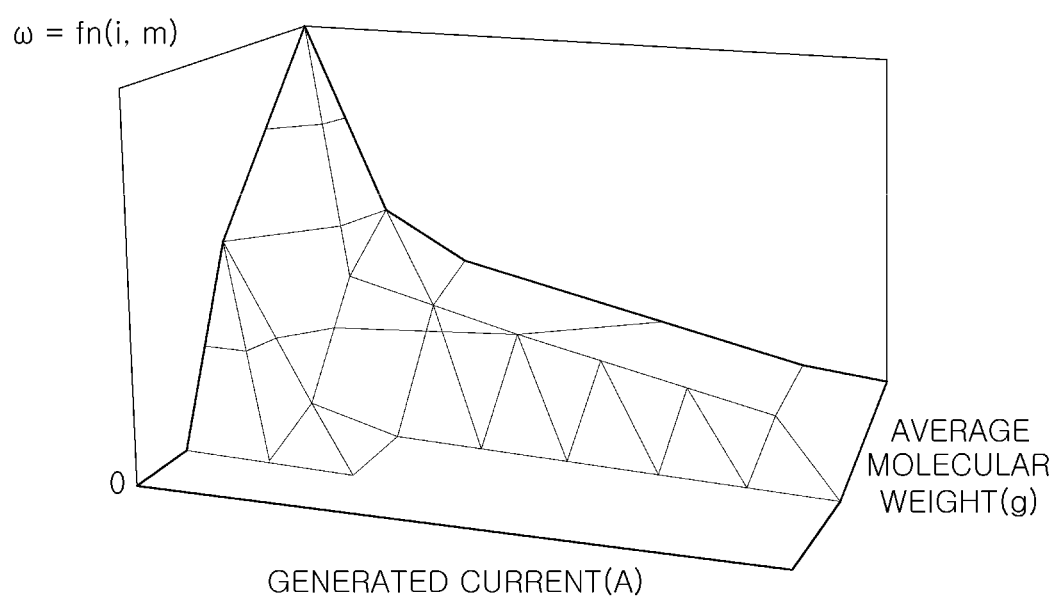
FIG. 5 is a diagram illustrating a weight having reflected the flow amount of the gas according to an exemplary embodiment of the present disclosure.

FIG. 5 is a diagram illustrating a weight having reflected the flow amount of the gas according to an exemplary embodiment of the present disclosure. Referring to FIG. 5, a weight (w) having reflected the flow amount of gas according to an exemplary embodiment of the present disclosure may be previously mapped to be reduced as the flow amount of the gas estimated by the flow amount estimator 50 is increased.

More specifically, the weight (ω) may be mapped to a two-dimensional map according to the generated current and the average molecular weight of the fuel cell 10. In particular, the weight (ω) may be inversely proportional to the magnitude of the generated current of the fuel cell 10 and proportional to the magnitude of the average molecular weight. In other words, the weight (ω) may be set to increase as the generated current of the fuel cell 10 decreases and to increase as the magnitude of the average molecular weight increases.

The purge amount estimator 60 may be configured to estimate the amount of purge for each gas as being proportional to the mass ratio of the corresponding gas among the total amount of purge. The mass ratio of each gas may be calculated by the ratio between the mass of each gas calculated by multiplying each gas amount (mol) by the molecular weight of the corresponding gas. In particular, the purge amount estimator 60 may be configured to estimate the amount of purge for each gas by reflecting a weight (ω) to the mass of nitrogen, for the purge amount of nitrogen among the total amount of purge.

Specifically, the purge amount of hydrogen, the purge amount of nitrogen, and the purge amount of vapor may be calculated using the following equation. The total amount of purge may be calculated by multiplying the total purge rate by the holding time (t) as described above.

$$n_{H_2\_purge} = \frac{M_{H_2} n_{H_2}}{M_{H_2} n_{H_2} + \omega M_{N_2} n_{N_2} + M_V n_V} n_{purge}$$

$$n_{N_2\_purge} = \frac{\omega M_{N_2} n_{N_2}}{M_{H_2} n_{H_2} + \omega M_{N_2} n_{N_2} + M_V n_V} n_{purge}$$

$$n_{V\_purge} = \frac{M_V n_V}{M_{H_2} n_{H_2} + \omega M_{N_2} n_{N_2} + M_V n_V} n_{purge}$$

wherein, the ω refers to a weight, the $M_{H_2}$, $M_{N_2}$, and $M_V$ refer to the molecular weights of hydrogen, nitrogen, and vapor, respectively, and the $n_{purge}$ refers to the total amount of purge.

The present disclosure may further include a purge controller 80 configured to adjust an opening period, an opening degree, or an opening holding time of the purge valve 30 based on the amount of purge estimated by the purge amount estimator 60. The purge controller 80 according to an exemplary embodiment may be configured to adjust an opening period, an opening degree, or an opening holding time of the purge valve 30 to adjust the amount of purge changed as the flow amount of the gas is changed to be the same as before. Accordingly, the purge gain (C) may be changed.

When the flow amount of the gas is reduced, the purge amount of nitrogen compared to the total amount of purge is increased, and thus, the purge controller 80 may be configured to increase the opening period of the purge valve 30, reduce the opening degree of the purge valve 30, or reduce the opening holding time of the purge valve 30 to cause the purge amount of nitrogen to be the same. Conversely, when the flow amount of gas is increased, the control may be reversed to the above process.

A system for estimating hydrogen concentration of the fuel cell 10 using the system for estimating the amount of purge of the fuel cell 10 according to an exemplary embodiment of the present disclosure, may include a concentration estimator 70 configured to estimate hydrogen concentration in the recirculation line 20 based on the amount of purge estimated by the purge amount estimator 60. Specifically, the concentration estimator 70 may be configured to estimate the hydrogen concentration in the recirculation line 20 based on the total amount of gas in the recirculation line 20, the amount of crossover crossed-over between the anode side and the cathode side of the fuel cell 10, and the estimated amount of purge for each gas.

Additionally, the concentration estimator 70 may be configured to estimate the concentration for each gas in the recirculation line 20, and the purge amount estimator 60 may be configured to estimate the total amount of purge discharged through the purge valve 30, and estimate the amount of purge for each gas using the estimated total amount of purge and the concentration for each gas estimated by the concentration estimator 70. The purge amount estimator 60 may further be configured to estimate the number of moles for each gas included in the recirculation line 20 using the concentration for each gas in the recirculation line 20 estimated immediately before by the concentration estimator 70. The total number of moles of the gas included in the recirculation line 20 may be estimated using the gas pressure (P), the volume (V), and the temperature (T) of the recirculation line 20 using the following equation.

$$n_{An} = \frac{P_{An} V_{An}}{RT} [\text{mol}]$$

wherein, the R refers to a gas constant, 8.314 [J/molK].

A method for estimating the concentration for each gas in the recirculation line 20 by the concentration estimator 70 will be described later. The method described herein below may be executed by a controller. Particularly, referring back to FIG. 2, a method for estimating the hydrogen concentration of the fuel cell 10 according to an exemplary embodiment of the present disclosure may include estimating the flow amount of gas in the recirculation line 20 for circulating the gas containing hydrogen to the anode side of the fuel cell 10 (operation S100); estimating the amount of purge for each gas discharged to the outside through the purge valve 30 positioned in the recirculation line 20 based on the estimated flow amount of the gas (operation S300); and estimating hydrogen concentration in the recirculation line 20 based on the estimated amount of purge (operation S400).

The estimating of the flow amount of the gas in the recirculation line 20 (operation S100) may include estimating the flow amount of the gas as being increased as the generated current or the generated power of the fuel cell 10 increases. The estimating of the flow amount of the gas in the recirculation line 20 (operation S100) may further include estimating the flow amount of the gas as being increased as the average molecular weight of the gas included in the recirculation line 20 reduces.

The estimating of the amount of purge for each gas (operation S300) may include estimating the amount of purge for each gas as being proportional to the mass ratio of the corresponding gas among the total amount of purge. In particular, the estimating of the amount of purge for each gas (operation S300) may include estimating the amount of purge for each gas by reflecting the weight (ω) to the mass ratio of nitrogen, for the purge amount of nitrogen among the total amount of purge, and the weight (ω) may be previously mapped to be reduced as the flow amount of the gas estimated by the flow amount estimator 50 increases.

Prior to estimating the amount of purge for each gas (operation S300), the present disclosure may further include calculating the differential pressure between the front end and the rear end of the purge valve 30, and estimating the total amount of purge discharged through the purge valve 30 using the calculated differential pressure. The estimating of the amount of purge for each gas may include estimating the amount of purge for each gas using the estimated total amount of purge, the estimated flow amount of the gas in the recirculation line 20 and the previously estimated concentration for each gas in the recirculation line 20.

The estimating of the hydrogen concentration in the recirculation line 20 (operation S400) may include estimating the hydrogen concentration in the recirculation line 20 based on the total amount of gas in the recirculation line 20, the amount of crossover crossed-over between the anode side and the cathode side of the fuel cell 10, and the estimated amount of purge for each gas. Specifically, a gas diffusion rate may be inversely proportional to the thickness of the electrolyte membrane of the fuel cell 10 stack, and proportional to the gas partial pressure difference between the anode side and the cathode side. In other words, the amount of crossover may be calculated by applying the following FICK's LAW (Diffusion Law).

$$\frac{\dot{m}}{A} = -D\frac{\partial c}{\partial x} = -D\frac{M}{RT}\frac{\partial P}{\partial x}$$

wherein the $\dot{m}$ refers to a mass diffusion rate (g/s) of the gas, the A refers to a diffusion area, the D refers to a gas diffusion coefficient, the x refers to a diffusion distance, the c refers to a gas concentration, the R refers to an universal gas constant (8.314 J/mol), and the P refers to a gas Pressure, the T refers to a gas temperature, and the M refers to the molar mass (g/mol) of the gas. This may be summarized as follows.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

wherein the $\dot{n}$ refers to a crossover rate with time (mol/s). The amount of crossover may be calculated by multiplying the crossover rate with time by the time. In other words, the crossover rate crossed-over between the electrolyte membranes of the fuel cell 10 stack may be calculated by the following equation.

$$\dot{n}_{N2\_xo} = \frac{D_{N2}}{RT}\frac{P_{ca,N2} - P_{An,N2}}{\delta}A$$

wherein the $\dot{n}_{N2\_xo}$ to refers to a diffusion rate of nitrogen, the P refers to a pressure, [kPa], the R refers to a gas constant, 8.314 [J/mol/K], the T refers to a temperature, the [K], D refers to a diffusion coefficient, the A refers to an area of an electrolyte membrane, the δ refers to the thickness of an electrolyte membrane, the $P_{CE.112}$ refers to a nitrogen partial pressure at the cathode 12 side of the fuel cell 10, the $P_{An,v}$ refers to a nitrogen partial pressure at the anode side of the fuel cell 10.

$$\dot{n}_{v\_xo} = \frac{D_v}{RT}\frac{P_{Ca,V} - P_{An,V}}{\delta}A$$

wherein the $\dot{n}_{v\_xo}$ refers to a diffusion rate of vapor, the P refers to a pressure, [kPa], the R refers to a gas constant 8.314 [J/mol/K], the T refers to a temperature, [K], the D refers to a diffusion coefficient, the A refers to an area of an electrolyte membrane, the δ refers to the thickness of an electrolyte membrane, the $P_{CE.V}$ refers to a vapor partial pressure at the cathode side of fuel cell 10, the $P_{An,v}$ refers to a vapor partial pressure at the anode side of fuel cell 10.

Conversely, hydrogen may be crossed-over from the anode side of the fuel cell 10 to the cathode side thereof.

$$n_{H2\_xo} = \frac{D_{H2}}{RT}\frac{P_{An,H2} - P_{Ca,H2}}{\delta}A$$

wherein the $n_{H2\_xo}$ refers to a hydrogen diffusion rate, the P refers to a pressure, [kPa], the R refers to a gas constant, 8.314 [J/mol/K], the T refers to a temperature, [K], the D refers to a diffusion coefficient, the A refers to an area of an electrolyte membrane, the δ refers to the thickness of an electrolyte membrane, the $P_{An,H2}$ refers to a hydrogen partial pressure at the anode side, and the $P_{Ca,H2}$ refers to a hydrogen partial pressure at the cathode side.

In addition, the crossover rate may be proportional to the gas diffusion coefficient, and the gas diffusion coefficient (D) may be changed according to the water content and the temperature of the electrolyte membrane positioned between the anode side and the cathode side of the fuel cell 10.

The gas diffusion coefficient (D) may also use a fixed constant value, but to further increase accuracy, the gas diffusion coefficient (D) may also use a value changed based on the state of degradation, temperature, etc. of the fuel cell 10. More specifically, the gas diffusion coefficient (D) may be calculated using a value changed according to the water content and the temperature of the electrolyte membrane positioned between the anode side and the cathode side of the fuel cell 10. In addition, the gas diffusion coefficient (D) may also be calculated as being changed as the electrolyte membrane of the fuel cell 10 stack is deteriorated.

The initial amount of nitrogen and the initial amount of stream in the recirculation line 20 may be predicted, respectively. In an exemplary embodiment, it may be possible to predict the initial amount of nitrogen and the initial amount of vapor at restart by reflecting the stop time, at which a state where power generation has been stopped is maintained, to the amount of nitrogen and the amount of vapor estimated before the power generation of the fuel cell 10 according to the start-off of the fuel cell 10 is stopped.

It may be possible to calculate the current amount of nitrogen in the recirculation line 20 based on the amount of nitrogen crossed-over and the amount of nitrogen purged by calculating the initial amount of nitrogen and the amount of nitrogen crossed-over and the amount of nitrogen purged at the anode side, respectively. In addition, it may be possible to calculate the current amount of vapor in the recirculation line 20 by calculating the predicted initial amount of vapor, the amount of vapor crossed-over, and the amount of vapor purged, respectively. It may be possible to estimate the current amount of hydrogen by subtracting the current amount of nitrogen and the current amount of vapor from the total amount of gas in the recirculation line 20. The hydrogen concentration may be estimated by dividing the current amount of hydrogen by the total amount of gas.

After estimating the hydrogen concentration (operation S400), the present disclosure may further include adjusting an opening period, an opening degree, or an opening holding time of the purge valve 30 based on the estimated amount of purge or the estimated hydrogen concentration (operation S500). Specifically, the adjusting process (operation S500) may include determining whether the estimated hydrogen concentration corresponds to the target hydrogen concentration, and operating the purge valve 30 to adjust the concentration to correspond to the target hydrogen concentration. The adjusting process (operation S500) may further include adjusting the hydrogen concentration in the recirculation line 20 by varying the amount of purge by adjusting the opening period, the opening degree, or the opening holding time of the purge valve 30. Alternatively, when the estimated hydrogen concentration in the recirculation line 20 is maintained within a predetermined range is a predetermined lower limit value, the adjusting process (operation S500) may include maintaining the opening degree of the purge valve 30 for a predetermined holding time or maintaining the opening degree of the purge valve 30 until reaching a predetermined upper limit value.

In another exemplary embodiment, the adjusting process (operation S500) may include adjusting the hydrogen concentration in the recirculation line 20 by operating a hydrogen supply valve or an ejector between a hydrogen tank and the recirculation line 20. In other words, when the estimated hydrogen concentration is less than the target hydrogen concentration, the adjusting process (operation S500) may include opening the hydrogen supply valve and operating the ejector to supply hydrogen to the recirculation line 20. Accordingly, it may be possible to estimate the hydrogen concentration with improved accuracy, and accordingly, to prevent unnecessary purge and properly control the purge so that the hydrogen concentration may be maintained at a certain concentration or more, thereby enhancing fuel economy and enhancing durability of the fuel cell 10 stack.

While it has been illustrated and described with respect to the specific exemplary embodiments of the present disclosure, it will be understood by those skilled in the art that various improvements and changes of the present disclosure may be made within the technical spirit of the present disclosure as prepared by the following claims.

What is claimed is:

1. A method for estimating hydrogen concentration of a fuel cell, comprising:
    estimating, by a controller, a flow amount of the gas in a recirculation line for circulating the gas including hydrogen to an anode side of a fuel cell, wherein the flow amount of the gas is estimated as being increased as an average molecular weight of the gas comprised in the recirculation line is reduced;
    estimating, by the controller, the amount of purge for each gas discharged to the outside through a purge valve positioned in the recirculation line based on the estimated flow amount of the gas; and
    estimating, by the controller, hydrogen concentration in the recirculation line based on the estimated amount of purge.

2. The method for estimating hydrogen concentration of the fuel cell of claim 1, wherein the estimating of the flow amount of the gas in the recirculation line includes estimating the flow amount of the gas as being increased as the generated current or the generated power of the fuel cell increases.

3. The method for estimating hydrogen concentration of the fuel cell of claim 1, wherein the estimating of the amount of purge for each gas includes estimating the amount of purge for each gas as being proportional to a mass ratio of the corresponding gas among a total amount of purge.

4. The method for estimating hydrogen concentration of the fuel cell of claim 3, wherein the estimating of the amount of purge for each gas includes estimating the amount of purge for each gas by reflecting a weight to a mass of nitrogen, for the purge amount of nitrogen among the total amount of purge, and wherein the weight is previously mapped to be reduced as the flow amount of the gas estimated by the flow amount estimator increases.

5. The method for estimating hydrogen concentration of the fuel cell of claim 1, further comprising,
    prior to estimating the amount of purge for each gas, calculating, by the controller, the differential pressure between a front end and a rear end of the purge valve, and estimating a total amount of purge discharged through the purge valve using the calculated differential pressure,
    wherein the estimating the amount of purge for each gas includes estimating the amount of purge for each gas using the estimated total amount of purge, the estimated flow amount of the gas in the recirculation line, and a previously estimated concentration for each gas in the recirculation line.

6. The method for estimating hydrogen concentration of the fuel cell of claim 1, wherein the estimating the hydrogen concentration in the recirculation line includes estimating the hydrogen concentration in the recirculation line based on the total amount of gas in the recirculation line, an amount of crossover crossed-over between the anode side and a cathode side of the fuel cell, and the estimated amount of purge for each gas.

7. The method for estimating hydrogen concentration of the fuel cell of claim 1, further comprising, after estimating the hydrogen concentration in the recirculation, adjusting, by the controller, an opening period, an opening degree, or an opening holding time of the purge valve based on the estimated hydrogen concentration in the recirculation line.

* * * * *